Nov. 27, 1945.  E. A. STALKER  2,389,826
TORQUE CONVERTER
Original Filed Jan. 29, 1941    4 Sheets-Sheet 1
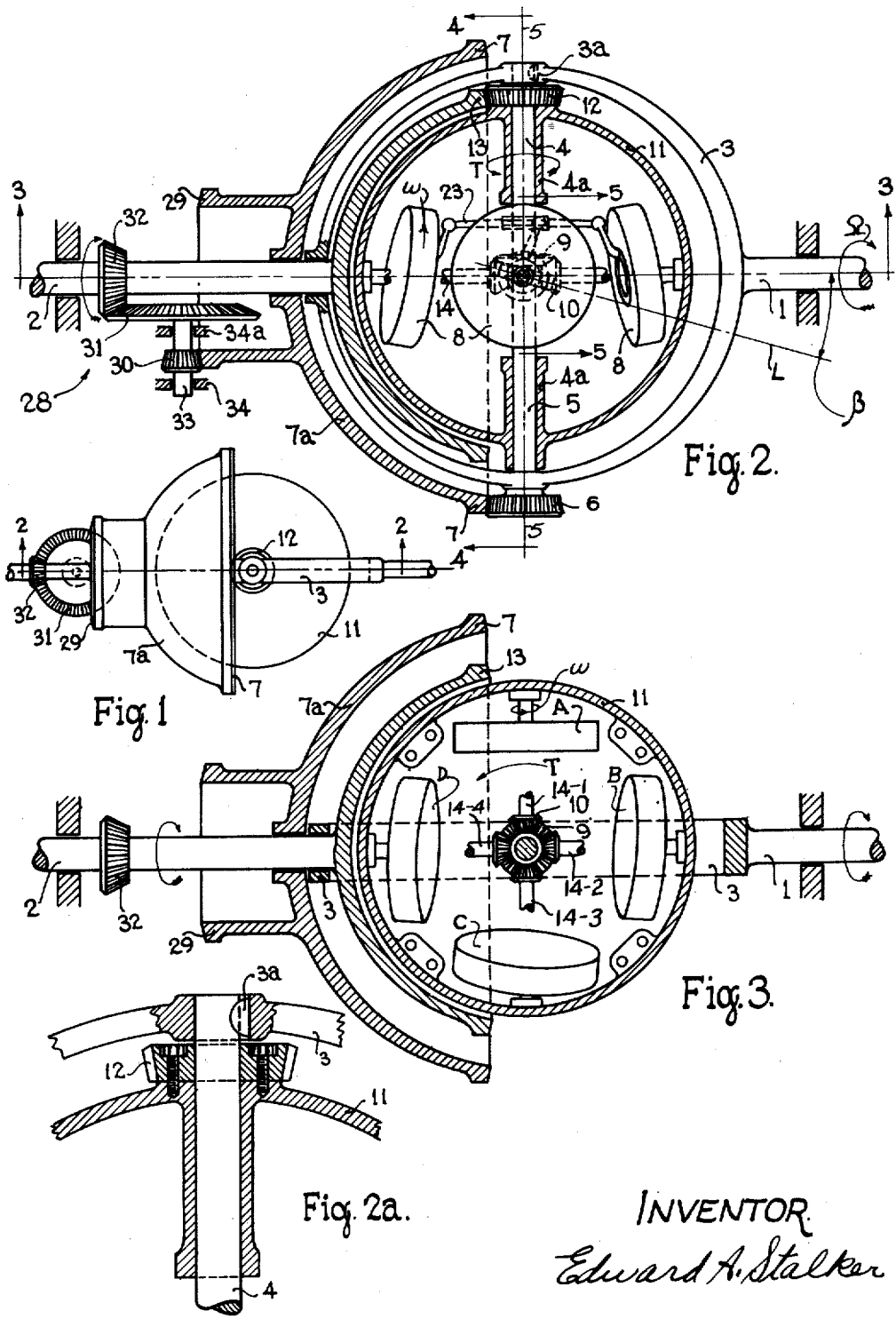
INVENTOR.
Edward A. Stalker Nov. 27, 1945.   E. A. STALKER   2,389,826
TORQUE CONVERTER
Original Filed Jan. 29, 1941    4 Sheets-Sheet 2

INVENTOR.
Edward A. Stalker

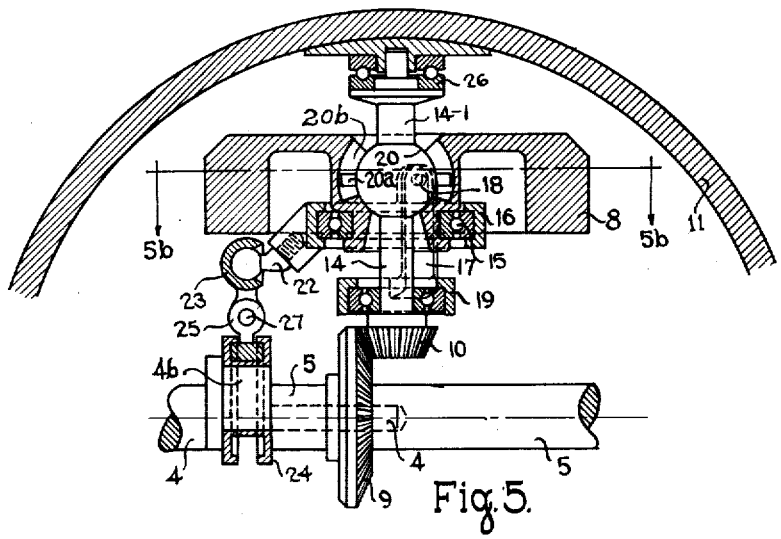

INVENTOR.
Edward A. Stalker

Patented Nov. 27, 1945

2,389,826

UNITED STATES PATENT OFFICE 2,389,826

TORQUE CONVERTER

Edward A. Stalker, Bay City, Mich.

Substituted for abandoned application Serial No. 376,489, January 29, 1941. This application November 17, 1943, Serial No. 510,583

20 Claims. (Cl. 74—5)

This application concerns a torque converter of the same type as that of my application Serial No. 324,677, filed March 18, 1940, but differs from it in providing a more effective mechanism for controlling the gyroscopes.

It is a substitute application for my abandoned application Serial Number 376,489, entitled "Torque converters," and filed January 29, 1941.

My invention relates to variable speed transmission and particularly that type which can magnify the torque and which has an infinite number of speed ratios, and its objects are first to provide an efficient torque converter automatically capable of dividing the power available into the proper torque and angular velocity of the driven shaft; second to provide a torque converter having a rigid gyroscope; third to provide means to deliver power from a driving element to a driven element by means of a gyroscopic element.

I attain these objects by the means illustrated in the accompanying drawings in which—

Figure 1 is a side elevation of the preferred torque converter;

Figure 2 is a fragmentary section through the machine along the line 2—2 in Figure 1;

Figure 2a is a fragmentary section taken along the line 2—2 in Figure 1;

Figure 3 is a fragmentary section along line 3—3 in Figure 2;

Figure 5D:
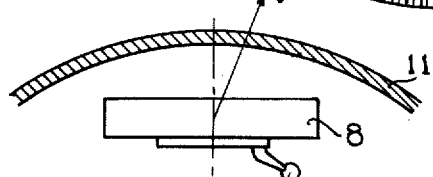
Figure 5 is a fragmentary section of the gyroscope along line 5—5 in Figure 2 with some associated parts.
Figure 5a is a section along the line 5a—5a in Figure 5b.
Figure 5b is a section taken along line 5b—5b in Figure 5.
Figure 5c is a side view of the eccentric 24.
Figure 9:
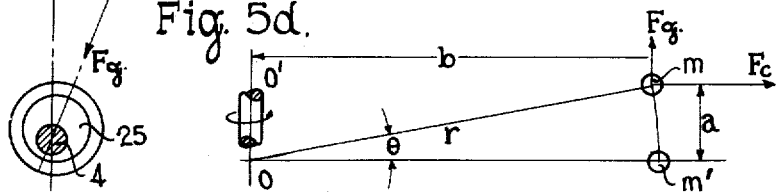
Figures 7A, 8:
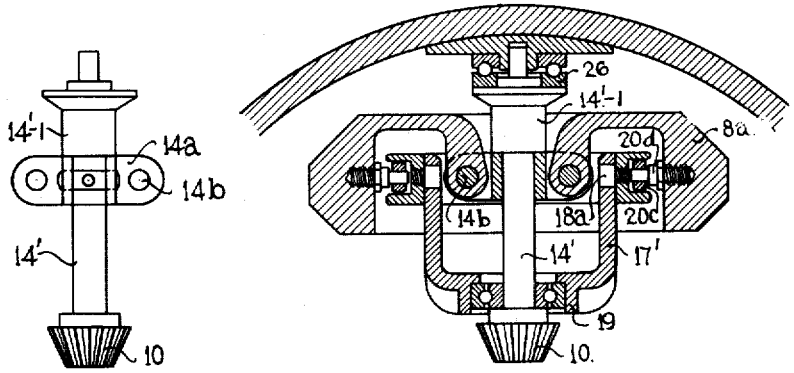

Figure 5d pertains to the theory;

Figure 6 is a fragmentary axial section of an alternate form of gyroscope;

Figure 7 is a section along the line 7—7 in Figure 6;

Figure 7a is a fragmentary section taken along line 7a—7a in Figure 7;

Figure 8 is a side view of the gyroscope shaft and hub;

Figure 9 pertains to the theory.

Figure 4:
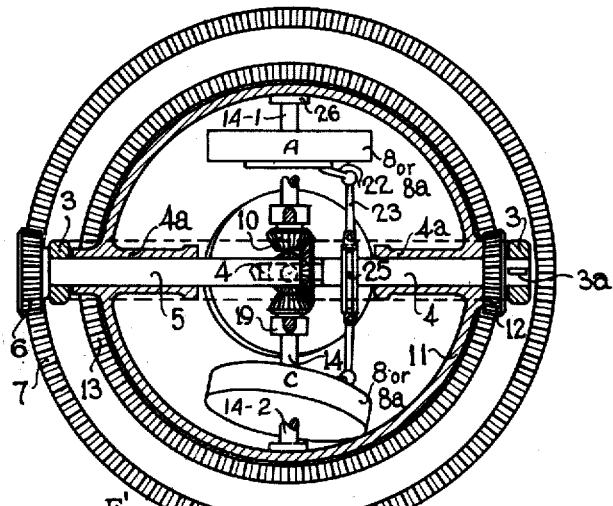
Figure 4 is a fragmentary section along line 4—4 in Figure 2.

In the figures the driving shaft is 1 and the driven shaft is 2. Fixed to the shaft 1 is the yoke 3 in which are borne the shafts 4 and 5. To shaft 5 is fixed the gear 6 in mesh with the gear 7 which is restrained from turning when the shaft 2 is restrained. The shaft 4 is fixed to yoke 3, as shown in Figures 2a and 4 by the key 3a, but shaft 5 turns in the yoke 3 and bearing 4a.

When the shaft 1 is rotated the gear 6 rolls on gear 7 and spins the gyroscopes 8 by means of the gears 9 and 10. The gyroscopes are supported by the shell 11 having fixed to it the gear 12. It is in mesh with the gear 13 fixed to the driven shaft 2. Gear 9 is fixed to shaft 5 and gear 10 to shaft 14.

A gyroscope has a spin axis about which it spins and a torque input axis transverse to the spin axis about which the gyroscope can be tilted—or rotated. As a result of the tilt about the torque input axis the gyroscope exerts a torque about a third axis perpendicular to the other two axes. This torque is called the precessional torque. It may also be called a gyroscopic torque because it arises from the action of the gyroscope.

Rotation of the driving shaft 1 spins each gyroscope about the axis of its shaft (14—1, 14—2, 14—3, 14—4). Since a gyroscope, A for instance, in Figure 3 is being turned also about the axis of shaft 1 (the torque input axis) there is a precessional torque tending to turn this gyroscope in the direction T (Figures 2 and 3). A gyroscope in position C however will tend to give an unfavorable precessional torque, opposite to T. Gyroscope B and D will give small torques. In other words for a gyroscope in the range DAB the torque is in the direction of T while for BCD the torque tends to be opposite to T. If the shell 11 and gear 12 are to have a net torque in the direction T the gyroscopes passing through the range DAB (Figure 3) must predominate in torque over the gyroscopes passing through the range BCD. If the net torque of the gyroscopes is such as to turn the shell 11 and gear 12 always in one direction, it is said that the shell 11 and gear 12 are subject to a unidirectional torque.

The shaft 5 can be rotated relative to shaft 4 because the latter has a projection of small diameter rotatably fitting into a bearing in the end of 5. See Figure 6.

If the gyroscopic torque applied to gear 12 is to be unidirectional the gyroscopes should be controlled to accomplish this end. For the gyroscope in position A in Figure 3 the direction of the gyroscopic torque is indicated by the arrow T. It can be readily shown however, that the torque of the gyroscope in position C is opposite to that of A. Hence if the gyroscope at C is permitted to act on the shell 11 it will oppose the torque of the gyroscope at A.

This difficulty is eliminated by allowing the gyroscope at C to tilt so that it cannot exert a countertorque.

The shaft 4 is held fixed relative to the yoke 3 by key 3a and has a crank 4b integral with it. Thus when the shell 11 and the gyroscopes rotate about the axis of 4 the crank imposes an oscillating or tilting motion on the gyroscopes.

Figure 5A:
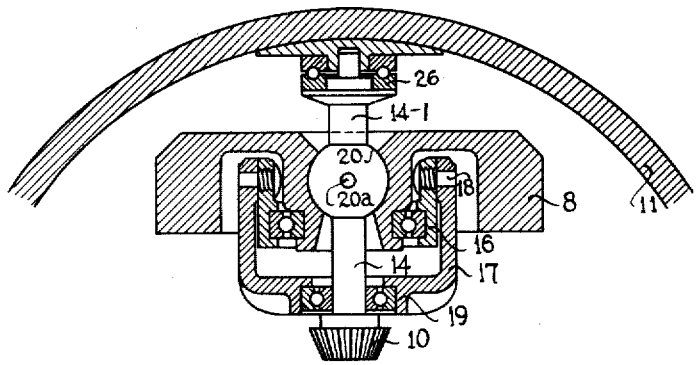

The mechanism to accomplish the tilting is best described in connection with Figures 5 and 5a where the gyroscope 8 is shown running on antifriction bearings 15 borne in the hub 16 and in the gyroscope 8. The hub is hinge supported on the clevis 17 by means of the pins 18. The gyroscope has a sufficiently wide hole through it to accommodate shaft 14 and permit the gyroscope to tilt.

Figure 3A:
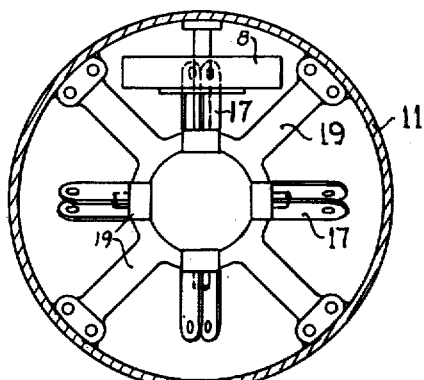
Figure 3a is a section through the shell 11 to show the spider 19.

The clevis 17 is part of the spider 19 which is supported on the shell 11 as shown in Figure 3a.

The shaft 14 has integral with it a spherical segment 20 and projecting from it the pin 20a which slides in grooves 20b as indicated in Figure 5. Thus the shaft 14 when turned by gear 10 can rotate the gyroscope 8 and it is free to tilt about the axis of the pins 18.

The degree of tilt of the gyroscopes is determined by the lever 22 fixed to the hub 16 and attached by the connecting rod 23 to the eccentric ring segment 25 rotatable in the eccentric 24. The rod 23 is hinged connected to the ring segment 25 at one end and connected to the lever 22 by a ball and socket joint as shown in Figure 5.

Figures 5B, 5C:
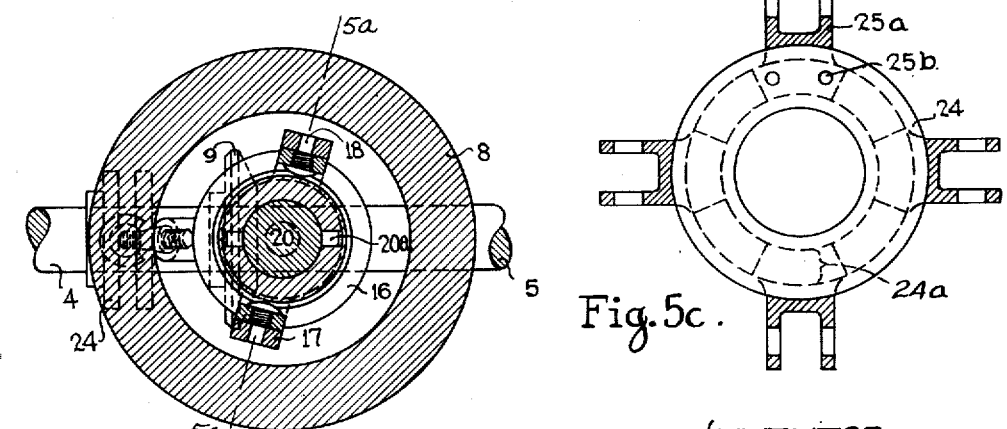

Of the four ring segments the master one 25a is fixed to the eccentric 24, as shown in Figure 5c, by the screws 25b. The other ring segments 25 have at one end shoes which slide within grooves 24a within 24 as shown in Figures 5 and 5c. These shoes have only a slight peripheral slip to accommodate the motion of the fixed segment 25a which would have an oscillating motion of smaller amplitude relative to the other ring segments.

The lengths of all three connecting rods are the same and consequently determine the setting of the gyroscopes relative to each other. Thus if the axis of symmetry of gyroscope A is set perpendicular to the axes of shaft 4 and shaft 1 the other gyroscopes will have the proper degrees of tilt since the gyroscopes are similar in dimensions.

The axes of the pins 18 each make the angle $\beta$ (Figure 2) with the axis of shaft 1 or with the plane of the spider 19. Every gyroscope rotated about the axis of shaft 4 into the position A assumes the same attitude as its predecessor in this position. This automatically follows from the similarity of the individual parts of the gyroscope and crank mechanism.

The axis of the pins 18 is transverse to the axis of the shaft 4 by an angle $\beta$ as shown in Figure 2 for reasons which will be stated subsequently.

Figure 5d shows how the precessional torque from a gyroscope in position A exerts a turning moment on gear 12. The precessional torque from the gyroscope is represented as a couple $F_zX$ according to the well-known principles of mechanics. The distance between the forces $F_z$ and $F'_z$ is X and the product of $F_z$ by X equals the precessional torque of the gyroscope. $F_z$ is equal to $F'_z$. Since the gyroscope cannot tilt freely torque is applied to the shell 11 through the support 26 and to the spider 19 through the pins 18. The actual force applied is the force $F'_z$ which has the arm X with respect to the axis of rotation (axis of shaft 4) and hence causes a torque about the axis of magnitude $F'_zX$. Every gyroscope coming into the position A exerts this torque. Shell 11 is fixed to the gear 12. The torque is transferred to the shaft 2 by the gear 13.

When the gyroscope moves to position C it is allowed to tilt by the eccentric to such an angle that there is a significant reduction in its gyroscopic torque.

When the gyroscope (Figure 5) is tilted its axis of spin is no longer coincident with the axis of shaft 14. As long as the axis of spin is transverse to the axis of the driving shaft 1 a gyroscopic or precessional torque is present on C. If however, the axis of spin should coincide with that of the driving shaft the torque would be zero. It is a maximum for the spin axis perpendicular to the axis of shaft 1. For positions between the two limiting ones just discussed the gyroscopic torque is less than the maximum. Hence if the gyroscope at A is perpendicular to the axis of shaft 1 and C is not, the torque of A predominates and the net result is a unidirectional torque.

If the torque of the driving shaft 1 is to be magnified and applied to the driven shaft 2 the gyroscopes must exert a precessional torque T about the precessional axis of shafts 4 and 5, Figures 2 and 3. They must also exert a torque about the axis of shaft 1 to aid the input torque. This is necessary to give a reaction for the magnified torque about the precessional axis because the gear 12 which transmits the precessional torque has teeth offset from the axis of shaft 1 and its tooth load can exert a torque about the torque input axis.

In order to get a component of the precessional torque acting about the torque input axis, the axis of the tilt which is the axis of pins 18 is skewed from the torque input axis by the angle $\beta$ (beta) as shown in Figure 2.

If the significance of the skewed axis of tilt is viewed with relation to the gyroscope in position C of Figure 3, it will be observed that the skewed axis provides for a component of tilt about an axis perpendicular to the plane of the paper, and a component of tilt about an axis lying in the plane of the paper. The tilting of the gyroscope about an axis perpendicular to the plane of the paper will destroy the adverse torque of the gyroscope about the axis of shaft 5; and a tilt of the gyroscope about an axis lying in the plane of the paper will destroy any gyroscopic torque opposing the torque of the gyroscope in position A which aids the driving torque of shaft 1.

Consider, particularly in Figures 2 and 3, that the driven shaft 2 is held from turning while shaft 1 is turned. The gyroscopes are spun about their respective spin axes and rotated about the axis of shafts 4 and 5 in a direction opposite to T, Figure 3. In this case due to the rotation about shaft 1 there is a torque in the direction of T as before but because gear 13 is fixed the gyroscopes cannot rotate in the direction T about the axis of shaft 4. Instead the rolling of gears 12 and 13 forces the gyroscopes to rotate in the opposite direction to T, Figure 3. In forcing the opposite rotation there arises now a new precessional torque aiding the input torque of shaft 1. The torque T is still present and exerting a torque on gear 13 but it does not result in a rotation in the direction T. The resultant torque from the gyroscopic action on a gyroscope in position A is the result of adding the torque T about 4 to a torque about the axis of 1. The axis of the combined torques would be about a line perpendicular to the line L in Figure 2. The line L then lies in the plane of action of the combined torques and the pins 18 transfer the torques to the spider 19 without putting a load on the connecting rod 23. However, again the torque of gyroscope C is adverse to that of A but by providing for a component of tilt in a plane perpendicular to the torque input axis the magnitude of the adverse torque is reduced and that of A again preponderates. Thus the gyroscope C should be tilted about an axis skewed to the torque input axis so that there is a component of tilt relative to both the precessional axis (axis of shaft 4) and the torque input axis. The structure providing the skewing has already been described.

In another form of the invention, Figures 6 and 7, the gyroscope 8a is composed of several segments and they are arranged to tilt in such a manner that their axis of spin is always that of the shaft 14'—1 in position A.

Each segment is hinged to the shaft 14'—1 by the pin 14b. Each segment could also be regarded as a gyroscopic mass or unsymmetrical gyroscope.

Encircling the clevis 17' is the tilting ring 16a tilting about the axis of the pins 18a in the clevis. The ring's motion is controlled by the arm 22' and the connecting rod and eccentric already described. The ring has a groove on the outside into which fit the rollers 20c carried rotatably on the pins 20d fixed in the segments of the gyroscope. It will now be apparent that when the wing is tilted the segments are tilted yet they are free to spin about the spin axis of shaft 14'—1.

The Figures 1 to 4 can be read for the gyroscope 8a by simply regarding the gyroscope 8 replaced by 8a.

The gyroscope of Figure 6 must be tilted about an axis transverse to the torque input and precessional axes in order to produce a unidirectional torque for the same reasons which obtained in the preferred form. The theory back of the reduction or annihilation of the torque of C is now however different.

In Figure 9 consider the mass $m$ which is rotatable about the axis $OO'$. Let it represent any element or particle of mass of the gyroscope in position C. The position $m'$ shows the mass acted upon by the centrifugal force only. The position $m$ shows the mass acted upon by the centrifugal force $F_c$ and the gyroscopic force $F_g$. This force is found by dividing the precessional torque of the mass $m$ by the radius $r$. (The particle $m$ rotating about $OO'$ is a gyroscope and subject to a precessional torque if the axis $OO'$ is tilted.) The mass takes up a position of balance under the action of these two forces when the moments balance. That is—

$$F_c a = F_g b \qquad (1)$$

or $$F_g r \cos \theta = F_c r \sin \theta \qquad (2)$$

$$F_g = F_c \tan \theta \qquad (3)$$

Since $m$ was any particle these equations hold for all particles of the gyroscope in position C and hence for the whole gyroscope. When this condition prevails the gyroscope in the position C will exert no adverse torque. It is the function of the tilting to bring this condition about.

From Equation 3 it follows that $$\tan \theta = \frac{F_g}{F_c} = \frac{mr\Omega\omega}{mr\omega} \qquad (4)$$

$$\tan \theta = \frac{\Omega}{\omega} \qquad (5)$$

where $\Omega$ is the angular velocity about the torque input axis (axis of shaft 1) and $\omega$ is the spin about the spin axis (axis of shaft 14).

It is shown by Equation 5 that the angle $\theta$ depends on the ratio of angular velocities. However the "throw" of the eccentric 25 is fixed and constrains the gyroscope to a definite and unalterable angle of tilt $\theta$. Hence the ratio of $\Omega$ to $\omega$ should be held constant so that the gyroscope in position C will not be acting against the gyroscope in position A. The method of accomplishing this is now to be described.

If the gear 7, Figure 2, were held at rest while shaft 1 was turning, the gyroscopes would receive a spin from the rolling of gear 6 on gear 7 and also, since shaft 2 is held, another increment of spin, because the gear 12 would roll on gear 13 carrying gears 10 around gear 9 in a direction opposite to its rotation imposed by gear 6. On the other hand if shaft 2 is free to turn at the same rate as 1 there is no added increment of spin from gear 12 rolling on 13. Thus it is apparent that the spin does not normally bear a constant ratio to the angular velocity of shaft 1. It could however if gear 7 were turned in the direction of shaft 1 at a sufficient rate to compensate for any spin arising from the rolling of gear 12 on gear 13.

The gear train 28 in Figure 2 serves the purpose of keeping the ratio $\Omega$ to $\omega$ constant. A bevel gear 29 is fixed to the case 7a and is in mesh with the pinion 30 on the same shaft 33 with gear 31 which is in mesh with bevel gear 32 fixed to the driven shaft 2. Hence the degree of restraint applied to shaft 2 determines the rate of rotation of gear 7. When shaft 2 begins to turn, the spin from gear 12 decreases but is compensated by gear 7 being turned against gear 6 to achieve a greater spin through the train 6, 9 and 10. Thus the gear train 28 keeps the ratio of $\Omega$ to $\omega$ constant.

The shaft 33 is of course rotatable in suitable bearings 34a and 34 fixed to proper supports.

The torque converter is particularly adapted to operation with an explosion engine as for instance the oil engine of an automobile.

With the automobile stationary the engine rotates shaft 1 in the direction $\Omega$. Gear 7 is at first stationary and the rolling of gear 6 thereon spins the gyroscopes. Furthermore since gear 13 is also stationary, gear 12 and the shell 11 are rotated resulting in the gears 10 being rotated against gear 9 with a consequent increase in the spin of the gyroscopes. Because of the spin $\omega$ and the impressed rotation $\Omega$ there is a gyroscopic torque for a gyroscope in position A of magnitude T which is—

$$T = I_p \Omega \omega$$

where $I_p$ is the polar moment of inertia of gyroscope A.

Still no power is expended except to overcome friction in the mechanism because power is the product of torque and angular velocity and as yet the driven shaft is not turning. The torque is not zero and so there is a torque applied to the driven shaft 2. The engine is enabled to rotate the gear 12 against this torque because the rotation of the gyroscopes about the axis of shaft 4 produces a torque in the same direction as the engine torque.

As the speed of the engine increases the torque T increases until it is large enough to turn shaft 2 which extends to the axle of the car and turns it. As the car gets under way the gear 7 is turned against gear 6 so that the spin ω always has a constant ratio to the angular velocity Ω of the driving shaft. Finally the speed increases so that the torque of the gyroscopes is large enough so that gear 12 does not roll on gear 13. The drive is then 1 to 1 between shafts 1 and 2.

The mechanism is suitable for power transmission in all types of machinery to act as a coupling or as a variable speed or variable torque device. For instance it may be used for electric motors, the coupling of steam turbine and expansion engines, and for the driving of machine tools and production machinery. These are only a few of the many uses.

It is to be noted that when the gyroscopic masses 8a are oscillated about the axes of the pins 14b they are also oscillated relative to the precessional axis, the axis of shafts 4 and 5, for any position of the masses about the spin axis.

While I have illustrated certain specific forms of the invention it is to be understood that I do not limit myself to these exact forms but intend to claim my invention broadly.

What is claimed is:

1. In a mechanism in combination a driving element rotatable about a torque input axis, a driven member, a mass, means including said driving element and said driven member for mounting said mass for simultaneous rotations about three mutually transverse axes namely said torque input axis, a spin axis and a precessional axis and for imparting a unidirectional spin to said mass about the spin axis, said first named means including a supporting means for said mass adapting it for both a controlled oscillation relative to the precessional axis and a rotation thereabout, cam means to oscillate said mass relative to the precessional axis in coordination with the rotation of the mass about the torque input axis to produce a unidirectional torque, said driven member being adapted to receive said torque.

2. In a mechanism the combination of a mass, a driving element, a driven element, mounting means for mounting said mass for simultaneous rotations about three mutually transverse axes namely a spin axis, a precessional axis about which the driven element is rotatable, and a torque input axis about which the driving element rotates, means for rotating said mounting means by said driving element, means for imparting a unidirectional spin to said mass about the spin axis, said mounting means being adapted for the tilting of said mass about a fourth axis transverse to said spin axis, means to oscillate said mass about said fourth axis in coordinated relation with its rotation about the precessional axis whereby the mass produces a preponderance of torque in one direction, said means to oscillate being operably connected to said driven element to derive oscillation power therefrom, said mass being substantially rigid against forces directed along the spin axis, said mounting means being adapted for the application of the precessional torque to the driven element.

3. In a mechanism the combination of a mass, a driving element, a driven element, mounting means for mounting said mass for simultaneous rotations about three mutually transverse axes namely a spin axis, a precessional axis about which the mass can precess through a complete turn about the precessional axis as a result of the rotation about a spin axis and a torque input axis, and a torque input axis about which the driving element rotates, spinning means including said driven element for imparting a spin to the said mass about the spin axis, means to govern the rotation of the gyroscopic mass relative to one of said axes to produce a unidirectional precessional torque, and means operably connecting said spinning means with said driven element to establish a substantially constant ratio between the rate of spin of said mass about the spin axis and the rate of rotation about the torque input axis, and means for the application of said precessional torque to the driven element, said means to mount providing a substantially fixed angular relation between said torque input axis and said precessional axis.

4. In a mechanism the combination of a mass, a driving element, a driven element, mounting means for mounting said mass for simultaneous rotations about three mutually transverse axes namely a spin axis, a precessional axis about which the driven element is rotatable, and a torque input axis about which the driving element rotates, means for rotating said mass about said input axis by said driving member, means for imparting a spin to the said mass about the spin axis, said mounting means being adapted for the tilting of said mass about a fourth axis substantially transverse to each of said three axes, and means to tilt said mass relative to the driven element about the fourth axis in coordination with its rotation about the precessional axis to produce a unidirectional precessional torque, said mounting means being adapted to apply said precessional torque to the driven element and being adapted for the complete revolution of the mass about the precessional axis, said spin axis always being substantially transverse to the axis of rotation of said driven element.

5. In a gyroscope torque converter a driving element, a precessional member, a gyroscopic mass, means for mounting said mass for simultaneous rotations about three mutually transverse axes, namely a torque input axis, a spin axis and a precessional axis and for imparting a spin to said mass about the spin axis, means for rotating said mass about said input axis by said driving element, and a part pivotally supported on said precessional member and defining a fourth axis transverse to said spin axis and to said precessional axis, said first named means including said precessional member and said part and adapting said mass for controlled inclination about said fourth axis relative to said precessional member, and means to incline said mass relative to said precessional member in coordination with its rotation about the precessional axis so that said member is subject chiefly to a unidirectional torque arising from the rotation of said mass about the torque input and spin axes, said mounting means being adapted to fix the direction of the fourth axis relative to said precessional axis.

6. In a mechanism in combination a driving element rotating about a torque input axis, a mass, a supporting member for said mass, means including said member for mounting said mass for simultaneous rotations about three mutually transverse axes namely said torque input axis, a spin axis and a precessional axis and for imparting a unidirectional spin to said mass about the spin axis, means for rotating said mass about said input axis by said driving element, said supporting member being adapted for oscillating with said mass relative to said means for mounting, a connecting rod connecting said member to said means for mounting, said rod being variably connected at both its ends and at one end at least for rotations relative to said member about at least two mutually transverse axes, and means to oscillate said connecting rod whereby to produce a unidirectional torque of said mass applied to said first named means.

7. In a mechanism, in combination, a driving element rotating about a torque input axis, a mass, a precessional member rotatable about the precessional axis, means including said member for mounting said mass for simultaneous rotations about three mutually transverse axes, namely said torque input axis, a spin axis and a precessional axis and for imparting a unidirectional spin to said mass about the spin axis, means for rotating said mass about said input axis, said mounting means being adapted for the oscillation of said mass relative to said precessional member, and means to oscillate the said mass relative to said precessional member so that the mass is given a preassigned displacement along a major portion of the path between the limits of said oscillation in coordination with the rotation of the mass about the precessional axis, whereby to make the precessional torque of said mass unidirectional, said precessional member being adapted to receive said torque.

8. In a mechanism the combination of a mass, a driving element, a precessional element, mounting means including said precessional element for mounting said mass for simultaneous rotations about three mutually transverse axes namely a spin axis, a precessional axis about which the precessional element is rotatable and a torque input axis about which the driving element rotates, means for imparting a unidirectional spin to the mass about the spin axis, means for rotating said mass about said input axis by said driving element, said mounting means being adapted for the oscillation of said mass relative to the precessional axis and said precessional element, and means driven by the precessional element to give said mass said oscillation in coordination with its rotation about the precessional axis to produce a preponderance of precessional torque in one direction about the precessional axis, said precessional element being adapted to receive the precessional torque of said mass.

9. In a mechanism the combination of a mass, a precessional member, a driving element, mounting means including said precessional member for mounting said mass for simultaneous rotations about three mutually transverse axes namely a spin axis, a precessional axis about which the precessional member is rotatable, and a torque input axis about which the driving element rotates, means for imparting a unidirectional spin to the said mass about the spin axis, means for rotating said mass about said input axis by said driving element, an actuating part adapted to derive power from said driving element, means to oscillate said mass relative to said precessional member including said part which is variably connected at its ends, said means to oscillate being adapted to govern said oscillation of said mass in accordance with its rotation about the precessional axis whereby to produce a unidirectional torque, said mounting means being adapted for a complete turn of the mass about the precessional axis and to fix the direction of the precessional axis relative to the torque input axis and for the application of said torque to the precessional member.

10. In a variable speed gear, a driving shaft rotatable about a torque input axis, a driven shaft, a gyroscope mass, means supporting said gyroscope mass on said driving shaft for bodily rotation therewith and for rotation about three mutually transverse axes namely said torque input axis, a precessional axis and a spin axis, means for imparting a unidirectional spin to said gyroscope mass about the spin axis, and means to oscillate said gyroscope mass relative to said precessional axis in coordination with its rotation thereabout whereby the net precessional torque of said mass thereabout is made unidirectional, said gyroscope mass being adapted to make a complete precessional turn about the precessional axis, said driven shaft being adapted to receive said precessional torque the center of said mass being offset substantially from the precessional axis.

11. In combination in a variable speed mechanism, a driving shaft, a precessional element, a mass, a supporting member adapted for oscillating motion and for supporting said mass for oscillation about an axis relative to said precessional element and pivotally supporting said mass for spinning about an axis, mounting means including said member for mounting said mass for simultaneous rotations about three mutually transverse axes namely a torque input axis, a precessional axis and said spin axis, means for imparting a spin to said mass about the spin axis, means for rotating said mass about said input axis by the driving element, and a plurality of parts joined to each other and connecting said member to said mounting means to oscillate said mass in coordination with its rotation about the precessional axis and relative to the precessional element, each of at least two of said plurality of parts having variable connections at both its ends, said precessional element being adapted to receive the precessional torque of said mass resulting from the rotation about the torque input and spin axes, the oscillation of said supporting member and said mass making the said precessional torque applied to said precessional element unidirectional.

12. In a gyroscopic torque converter, a driving shaft rotatable about a torque input axis, a precessional shaft, a gyroscopic mass, means for supporting said precessional shaft for rotation about a precessional axis transverse to said torque input axis, mounting means including said precessional shaft for mounting said mass for simultaneous rotations about three mutually transverse axes namely said torque input axis, a precessional axis about which the precessional shaft rotates and a spin axis, means for rotating said mass about said input axis by said driving element, means for imparting a unidirectional spin to said mass about the spin axes, said means for mounting defining an oscillation having a substantially fixed direction transverse to said precessional axis and to said torque input axis, said means for mounting providing for the oscillation of said mass relative to said precessional shaft about said oscillation axis so that a gyroscopic torque is applied to said precessional shaft and to said driving shaft to aid its rotation, and means to govern said oscillation in coordination with the rotation of the mass about the precessional axis so that the said torques are unidirectional, said shafts being adapted to receive said torques.

13. In a gyroscopic torque converter, a driving element, a precessional member, a gyroscopic mass, means for mounting said mass for simultaneous rotations about each axis of a set of three mutually transverse axes constituting the basic axes for gyroscopic actions and reactions namely a torque input axis about which said driving element rotates, a precessional axis about which the said member is rotatable, and a spin axis about which the mass spins, said precessional axis of said set having a fixed attitude relative to said torque input axis, means for imparting a spin to said mass about said spin axis, means for rotating said mass about said input axis by said driving element, said mounting means being adapted for the oscillation of said mass relative to said member, and means to oscillate the said mass relative to said member in coordination with its rotation about the precessional axis to produce a preponderance of precessional torque in one direction about the precessional axis.

14. In a mechanism, in combination, a driving element rotating about a torque input axis, a mass, a precessional member rotatable about the precessional axis, a driven element rotatable about an axis, means including said member for mounting said mass for simultaneous rotations about three mutually transverse axes namely said torque input axis, a spin axis and a precessional axis and for imparting a unidirectional spin to said mass about the spin axis, means for rotating said mass about said input axis by said driving element, said mounting means being adapted for the oscillation of said mass relative to said precessional member, means to govern said oscillation in coordination with the rotation of the mass about said precessional axis so that a unidirectional torque is applied to said precessional member by said mass, said mounting means being adapted so that said precessional axis and the said axis of said driven element have a substantially fixed attitude relative to each other, and means to transmit the torque from said member to said driven element, said mass being substantially rigid against deforming forces directed along the spin axis.

15. In a gyroscopic torque converter, a mass, a driving shaft rotatable about a torque input axis, a precessional member rotatable about a precessional axis, mounting means including said member for mounting said mass for simultaneous rotations about three mutually transverse axes namely said torque input axis, said precessional axis and a spin axis, means for rotating said mass about said input axis by said driving shaft, means for imparting a spin to said mass about the spin axis, said mounting means being adapted for the oscillation of said mass relative to said precessional member about an axis transverse to said precessional axis, and means to coordinate the said oscillation of the mass with its rotation about the said precessional axis so that said mass has the same rate of rotation as said precessional member throughout a major portion of the rotation about said precessional axis and so that the precessional torque applied to said member is unidirectional, said precessional member being adapted to receive the precessional torque of said mass.

16. In a gyroscopic torque converter, a driving element, a precessional element, a mass, a control member rotatably connected to said mass and adapted for oscillating motion, means including said precessional element for mounting said mass for simultaneous rotations about three mutually transverse axes namely a torque input axis about which said driving element rotates, a precessional axis about which said precessional element rotates, and a spin axis, means for rotating said mass about the said input axis by said driving element, means for imparting a unidirectional spin to said mass about said spin axis, and a part operably connected to said control member and said driving element to derive oscillating power from said driving element to oscillate said mass relative to said precessional element whereby said mass delivers a unidirectional torque to said precessional element.

17. In a gyroscopic torque converter, a mass, a driving element rotatable about a torque input axis, a precessional member rotatable about a precessional axis, mounting means including said member for mounting said mass for simultaneous rotations about three mutually transverse axes namely said torque input axis, said precessional axis and a spin axis, means for rotating said mass about the said input axis by said driving element, means for imparting a unidirectional spin to said mass about the spin axis, said mounting means adapting said mass for oscillation relative to said precessional member, and variable means operably interconnecting said mass and said driving element to oscillate said mass relative to said precessional member in coordination with the rotation of the mass about the precessional axis, said variable means providing for the simultaneous rotations of said mass about said torque input axis and said precessional axis, said variable means providing for the self-propelled rotation of said mass about the precessional axis.

18. In a mechanism, the combination of a mass, a driving element, a driven element, mounting means including said driving element for mounting said mass for simultaneous rotations about three mutually transverse axes namely a spin axis, a precessional axis, and a torque input axis about which the driving element rotates, spinning means including said driving element for imparting a spin to the said mass about the spin axis, said mounting means being adapted for the tilting of said mass relative to said precessional axis about a fourth axis transverse to said spin axis, means to tilt the gyroscopic mass about said fourth axis through a substantially constant angle relative to said precessional axis producing a unidirectional torque, said mounting means being adapted for precessional rotation through a complete turn of said mass about said precessional axis under the action of its precessional torque simultaneously with the rotation about the torque input axis, and means operably connecting said spinning means with said driven element so that said driven element governs the spin of said mass and establishes a constant ratio between the rate of spin of said mass about the spin axis and its rate of rotation about the torque input axis for various rates of rotation of said driven element, and means to apply the said unidirectional torque to the driven element.

19. In a mechanism the combination of a mass, a precessional member, a driving element, mounting means including said precessional member for mounting said mass for simultaneous rotations about three mutually transverse axes namely a spin axis, a precessional axis about which the precessional member is rotatable, and a torque input axis about which the driving element rotates, means for imparting a unidirectional spin to the said mass about the spin axis, means for rotating said mass about said input axis by said driving element, an actuating part adapted to derive power from said driving element, means to oscillate said mass relative to said precessional member including said part which is variably connected at its ends, said means to oscillate being adapted to govern said oscillation of said mass in accordance with its rotation about the precessional axis whereby to produce a unidirectional torque, said mounting means being adapted for a complete precessional turn of the mass about the precessional axis and for fixing the direction of the precessional axis relative to the torque input axis and for the application of said unidirectional torque to the precessional member.

20. In a variable speed gear, a driving shaft rotatable about a torque input axis, a driven shaft, a gyroscopic mass, means supporting said gyroscopic mass on said driving shaft for bodily rotation therewith and for rotation about three mutually transverse axes namely said torque input axis, a precessional axis and a spin axis, means for rotating said mass about said input axis by said driving element, means for imparting a unidirectional spin to said gyroscopic mass about the spin axis, and means to oscillate said mass relative to said precessional axis in coordination with its rotation thereabout whereby the net precessional torque of said mass thereabout is made unidirectional, said gyroscopic mass being adapted to make a complete precessional turn about the precessional axis, said driven shaft being adapted to receive said precessional torque, the center of said mass being offset substantially

EDWARD A. STALKER.

Certificate of Correction

Patent No. 2,389,826.　　　　　　　　　　　　　　　　　November 27, 1945.

EDWARD A. STALKER

It is hereby certified that error appears in the printed specification of the above numbered patent requiring correction as follows: Page 7, second column, line 17, claim 20, after the word "substantially" insert *from the precessional axis.*; and that the said Letters Patent should be read with this correction therein that the same may conform to the record of the case in the Patent Office.

Signed and sealed this 14th day of May, A. D. 1946.

[SEAL]

LESLIE FRAZER,
*First Assistant Commissioner of Patents.* means for rotating said mass about said input axis by said driving element, an actuating part adapted to derive power from said driving element, means to oscillate said mass relative to said precessional member including said part which is variably connected at its ends, said means to oscillate being adapted to govern said oscillation of said mass in accordance with its rotation about the precessional axis whereby to produce a unidirectional torque, said mounting means being adapted for a complete precessional turn of the mass about the precessional axis and for fixing the direction of the precessional axis relative to the torque input axis and for the application of said unidirectional torque to the precessional member.

20. In a variable speed gear, a driving shaft rotatable about a torque input axis, a driven shaft, a gyroscopic mass, means supporting said gyroscopic mass on said driving shaft for bodily rotation therewith and for rotation about three mutually transverse axes namely said torque input axis, a precessional axis and a spin axis, means for rotating said mass about said input axis by said driving element, means for imparting a unidirectional spin to said gyroscopic mass about the spin axis, and means to oscillate said mass relative to said precessional axis in coordination with its rotation thereabout whereby the net precessional torque of said mass thereabout is made unidirectional, said gyroscopic mass being adapted to make a complete precessional turn about the precessional axis, said driven shaft being adapted to receive said precessional torque, the center of said mass being offset substantially

EDWARD A. STALKER.

---

Certificate of Correction

Patent No. 2,389,826.                                                                 November 27, 1945.

EDWARD A. STALKER

It is hereby certified that error appears in the printed specification of the above numbered patent requiring correction as follows: Page 7, second column, line 17, claim 20, after the word "substantially" insert *from the precessional axis.*; and that the said Letters Patent should be read with this correction therein that the same may conform to the record of the case in the Patent Office.

Signed and sealed this 14th day of May, A. D. 1946.

[SEAL]

LESLIE FRAZER,
*First Assistant Commissioner of Patents.*